(No Model.)

J. J. FRAIKIN.
CORN PLANTER.

No. 323,801. Patented Aug. 4, 1885.

Witnesses.
Chas. R. Burr
A. H. Olcott

Inventor.
John J. Fraikin
By Franck D. Johns.
His Attorney.

UNITED STATES PATENT OFFICE.

JOHN J. FRAIKIN, OF FORT WAYNE, INDIANA.

CORN-PLANTER.

SPECIFICATION forming part of Letters Patent No. 323,801, dated August 4, 1885.

Application filed April 27, 1885. (No model.)

*To all whom it may concern:*

Be it known that I, JOHN J. FRAIKIN, a citizen of the United States, residing at Fort Wayne, in the county of Allen and State of Indiana, have invented certain new and useful Improvements in Corn-Planters; and I do hereby declare the following to be a full, clear, and exact description of the invention, such as will enable others skilled in the art to which it appertains to make and use the same.

My invention relates to certain improvements in corn-planters; and it consists more particularly in providing a corn-planter with adjustable coverers hinged to the rear ends of the runners and projecting behind the seed-tubes, the construction and arrangement of which I will now proceed to point out and describe, reference being had to the accompanying drawings, in which—

Figure 1:
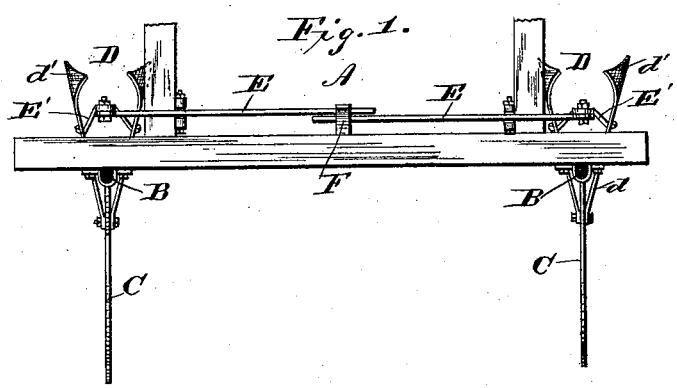
Figure 2:
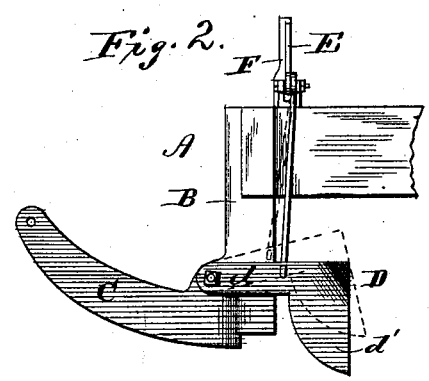
Figure 3:
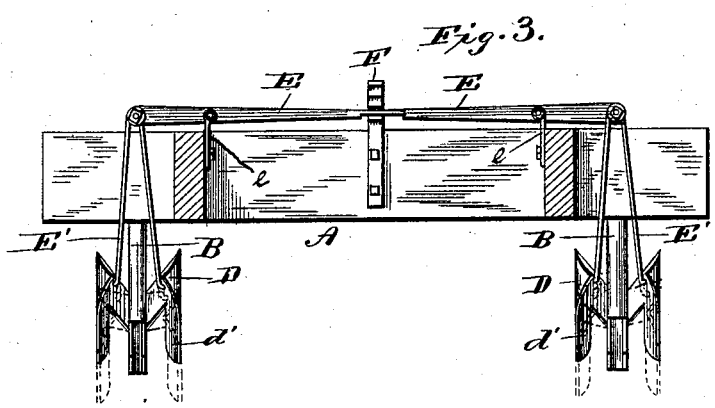

Figure 1 is a top plan view; Fig. 2, a side elevation; Fig. 3, a rear elevation.

Referring to said drawings, A is the forward part of the frame of a corn-planter.

B B are the seed-tubes, to the top of which are secured suitable hoppers and seed-dropping devices.

C C are runners secured to the front of the seed-tubes. Said runners may be connected with a suitable lever for raising the same and regulating the depth of planting, as described in Patent No. 270,049, granted to me January 2, 1883.

D D are adjustable coverers, having the arms $d\ d$ hinged to the foot of the seed-tubes and projecting back of said seed-tubes.

$d'\ d'$ are covering-blades formed on the rear ends of the arms $d\ d$. Said blades are concave on their inner faces.

E E are levers fulcrumed in standards $e\ e$, secured to the frame.

$E'\ E'$ are rods connecting the levers and coverers D D.

F is a notched standard on which the inner ends of the levers are secured and held at any desired point of adjustment. By moving the levers the blades $d'\ d'$ are forced down into the ground or raised out of the same. The depth of covering the seed can thus be regulated by adjusting the levers. When the coverers are adjusted to enter the ground, they act as cultivators, and also serve to cut away dead corn-stalks or other similar obstructions that may be in the line of planting.

Having thus fully described my invention, I claim as new and desire to secure by Letters Patent—

In a corn-planter, the seed-tubes B B and runners C C, in combination with the adjustable coverers D D, consisting of the arms $d$ and concave blades $d'$, hinged to the foot of the seed-tubes, and provided with adjusting-levers E E, substantially as shown and described.

In testimony whereof I affix my signature in presence of two witnesses.

JOHN J. FRAIKIN.

Witnesses:
 FRANK SCHOLES,
 CATHERINE FRAIKIN.